(12) United States Patent
Kleber

(10) Patent No.: US 8,994,242 B2
(45) Date of Patent: Mar. 31, 2015

(54) CAST-IN-PLACE INDUCTION ROTOR END RINGS WITH IMPROVED INTERLOCKS

(71) Applicant: GM Global Technology Operations LLC, Detroit, MI (US)

(72) Inventor: Richard M. Kleber, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 13/675,964

(22) Filed: Nov. 13, 2012

(65) Prior Publication Data

US 2014/0132105 A1   May 15, 2014

(51) Int. Cl.
*H02K 17/00* (2006.01)
*H02K 17/16* (2006.01)
*H02K 15/00* (2006.01)

(52) U.S. Cl.
CPC .............. *H02K 17/165* (2013.01); *H02K 17/16* (2013.01); *H02K 15/0012* (2013.01)
USPC ........................................... 310/211; 310/125

(58) Field of Classification Search
CPC .............................. H02K 17/165; H02K 17/16
USPC .......................................... 310/211, 125, 264
See application file for complete search history.

(56) References Cited

U.S. PATENT DOCUMENTS

| | | | | |
|---|---|---|---|---|
| 3,705,971 | A * | 12/1972 | Jacovides et al. | 219/121.14 |
| 3,902,087 | A * | 8/1975 | Hakamada et al. | 310/211 |
| 4,249,098 | A * | 2/1981 | Karlen et al. | 310/183 |
| 4,453,101 | A * | 6/1984 | Nelson | 310/211 |
| 6,710,498 | B1 * | 3/2004 | Lee et al. | 310/211 |
| 7,019,427 | B2 * | 3/2006 | Sasaki et al. | 310/156.78 |
| 2012/0217837 | A1 | 8/2012 | Kleber | |
| 2012/0217838 | A1 | 8/2012 | Kleber et al. | |
| 2012/0326555 | A1 * | 12/2012 | Arimatsu et al. | 310/216.121 |

OTHER PUBLICATIONS

U.S. Appl. No. 13/185,811, Kleber, Not Publ'd.

* cited by examiner

*Primary Examiner* — Thanh Lam

(57) ABSTRACT

An induction motor has a rotor core including a plurality of conductor bars and a shorting end ring having a plurality of grooves aligned with and mated to the first ends of the conductor bars. The rotor core further includes a cylindrically shaped steel laminate stack including a plurality of longitudinal grooves distributed around the periphery of the steel laminate stack. The conductor bars are each located in one of the plurality of longitudinal grooves and each includes a first end projecting from a first end of the steel laminate stack. The rotor core further includes an end sheet located to the end of the steel laminate stack, the end sheet including a retention feature configured to retain the shorting end ring to the end sheet.

17 Claims, 3 Drawing Sheets

CAST-IN-PLACE INDUCTION ROTOR END RINGS WITH IMPROVED INTERLOCKS

TECHNICAL FIELD

This disclosure is related to rotors for induction motors.

BACKGROUND

The statements in this section merely provide background information related to the present disclosure. Accordingly, such statements are not intended to constitute an admission of prior art.

An electric-powered induction motor transforms electric power to mechanical torque by inducing rotating magnetic fields between a static element, i.e., a stator, and a rotatable element, i.e., a rotor. The rotating magnetic fields generate torque on a shaft coupled to the rotor through conductor bars. Known stators induce current flows through conductor bars on the rotor that are preferably parallel to an axis of rotation of the rotor.

A known rotor for an induction motor includes a stack of steel sheets (i.e. laminated steel stack) assembled onto a rotatable shaft, and a plurality of conductor bars fabricated from conductive material, e.g., copper or aluminum. The conductor bars are contained in conductor bar grooves axially defined at the periphery of the laminated steel stack and are preferably connected at both axial ends of the rotors using shorting end rings.

Known rotor fabrication methods include placing the laminated steel stack into a casting mold and introducing molten material into open spaces formed in the rotor and open spaces between the die cast mold and the laminated steel stack to form the shorting end rings and conductor bars. It is known that oxide inclusions and voids may be formed in the conductor bars and shorting end rings during mold filling of molten material and solidification. The molten material may cool and partially solidify during turbulent flow of the molten material into the plurality of conductor bar grooves due in part to exposure to surface areas of the conductor bar grooves. The partially solidified molten material may impede molten material flow and cause voids, oxide inclusions, and other discontinuities in the conductor bars and the shorting end rings.

Power density output from an electric induction motor correlates to quality of the conductor bars and mass bulk density of the individual conductor bars. It is known that voids formed in the conductor bars and the shorting end rings during fabrication reduce power density output of the electric induction motor. The presence of oxide occlusions and cracks due to hot tearing reduces the electrical conductivity of the conductor bars and shorting end rings, thereby reducing the power density of the motor.

The use of copper material for conductor bars and/or shorting end rings may increase power density and heat transfer characteristics of an induction motor as compared to an induction motor using aluminum conductor bars and aluminum shorting end rings. Known use of copper material for conductor bars and shorting end rings increases manufacturing process times and complexity as compared to aluminum conductor bars. Known manufacturing processes for manufacturing conductor bars and shorting end rings include casting the conductor bars and shorting end rings in place around the laminate stack. Another approach is to pre-manufacture the conductor bars and shorting end rings for assembling onto the laminate stack to be welded or brazed in place.

SUMMARY

An induction motor has a rotor core including a plurality of conductor bars and a shorting end ring having a plurality of grooves aligned with and mated to the first ends of the conductor bars. The rotor core further includes a cylindrically shaped steel laminate stack including a plurality of longitudinal grooves distributed around the periphery of the steel laminate stack. The conductor bars are each located in one of the plurality of longitudinal grooves and each includes a first end projecting from a first end of the steel laminate stack. The rotor core further includes an end sheet located to the end of the steel laminate stack, the end sheet including a retention feature configured to retain the shorting end ring to the end sheet.

BRIEF DESCRIPTION OF THE DRAWINGS

One or more embodiments will now be described, by way of example, with reference to the accompanying drawings, in which.

DETAILED DESCRIPTION

Figure 1:
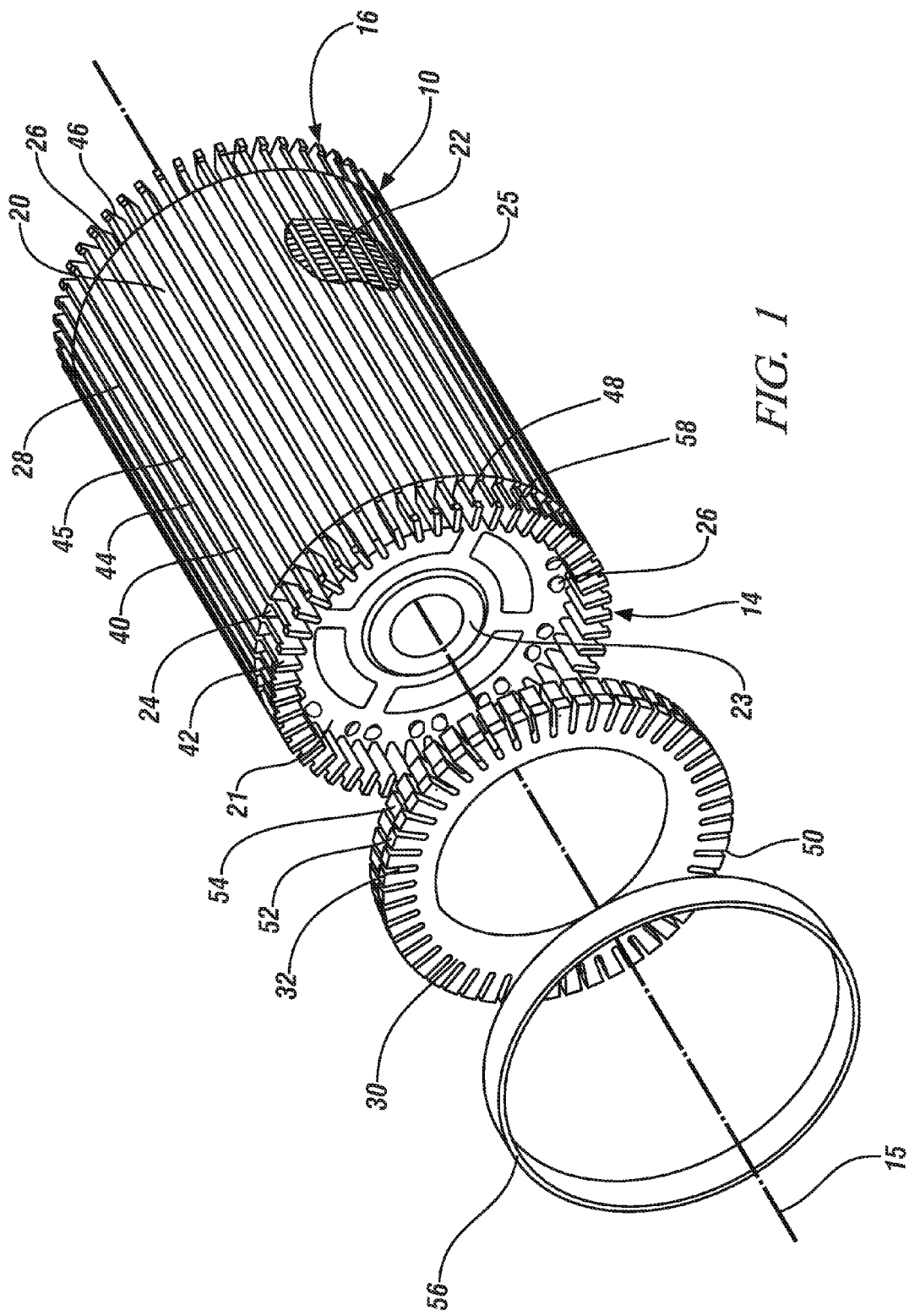
FIG. 1 is an isometric view illustrating a rotor core assembly for an induction motor, in accordance with the present disclosure.

Referring now to the drawings, wherein the showings are for the purpose of illustrating certain exemplary embodiments only and not for the purpose of limiting the same and like numbers are used to represent the same element throughout the drawings, FIG. 1 is an isometric view of a rotor core assembly 10 for an induction motor. The induction motor may be any induction motor, including an induction motor for use on a powertrain system for a motor vehicle. The rotor core assembly 10 is fixedly attached to a rotor shaft centered upon an axis of rotation 15 using any suitable manufacturing method, such as shrink fitting and lock-and-key torque fitting. It is appreciated that the rotor core assembly 10 may be assembled onto such a rotatable axle element subsequent to rotor core assembly. The rotor core assembly 10 and the rotor shaft share the same axis of rotation 15.

The rotor core assembly 10 includes a first end 14 and a second end 16. The rotor core assembly 10 is configured to be assembled into and rotate within a stator of an induction motor.

The rotor core assembly 10 includes an assembled cylindrically shaped rotor core 20 and a plurality of radially-oriented conductor bars 40 electrically connected to annular-shaped shorting end rings 30 that are assembled onto one or each of first and second ends 24 and 26, respectively, of the rotor core 20. The first end 24 of the rotor core 20 corresponds to the first end 14 of the rotor core assembly 10 and the second end 26 of the rotor core 20 corresponds to the second end 16 of the rotor core assembly 10. An axis of rotation of the rotor core 20 is coincident to the axis of rotation of the rotor core assembly 10 and the rotor shaft.

The rotor core 20 is fabricated from a plurality of thin laminate sheets 22 formed from ferric material, e.g., steel. In one embodiment the laminate sheets 22 are 0.33 mm (0.013 inches) thick. The laminate sheets 22 are stamped using a fine blanking process or similar manufacturing process and are preferably electrically insulated to minimize eddy currents. Each laminate sheet 22 is a flat annular-shaped device and includes a plurality of radially-oriented apertures formed near an outer periphery thereof When the laminate sheets 22 are assembled into the rotor core 20, the radially-oriented apertures are aligned to form grooves 28 that are parallel with the axis of rotation 15 and are radially-oriented near an outer periphery 25 of the rotor core 20. Alternatively, the grooves 28 may include an acute angle in relation to the axis of rotation 15. The grooves and the conductor bars herein will be discussed as longitudinally oriented with respect to the axis of rotation; however, this orientation is understood to include either an alignment that is parallel to the axis of rotation or at an acute angle from parallel with respect to the axis of rotation. The grooves 28 may have any suitable cross-sectional shape, and are substantially rectangular-shaped in one embodiment. The longitudinally-oriented grooves 28 are equally spaced around the periphery 25. The conductor bars 40 are each located or embedded within one of the grooves 28. As is appreciated, the laminate sheets 22 are assembled onto the axis of rotation 15 in a laminated fashion using any suitable fabricating method.

The conductor bars 40 are preferably fabricated from copper-based materials and are added to each of the grooves 28 by any suitable process, including, e.g., insertion or molding. Alternatively, the conductor bars 40 may be fabricated from aluminum-based or other electrically conductive material.

A spinning motor includes centrifugal forces and temperature changes that cause significant stresses within a motor. An end ring 30 molded onto an end of a rotor core 20 experiences significant forces that may act over time to separate the end ring 30 from the rotor core 20. Interlocking features can be utilized to retain the end ring 30 to the rotor core 20 to resist the end ring 30 from separating from the rotor core 20. These interlocking features can include features that include shapes that grip to mating features on the molded end ring.

The rotor core 20 includes a stack of thin laminate sheets 22 as disclosed herein. An end sheet 21 or a last sheet on the rotor core 20 can include similar groove features to interact with the conductor bars as the other laminate sheets 22 of rotor core 20. End sheet 21 can be constructed of steel, end sheet 21 can alternatively be constructed of copper to improve the conductive properties of the end sheet 21. A steel end sheet 21 can be made of thicker gage steel than steel plates used in the laminate stack to provide rigidity. A non-limiting exemplary thickness of steel end sheet 21 can be between 2.54 mm and 3.175 mm (0.100 inches and 0.125 inches). Similarly, a copper end sheet 21 can be constructed of copper with increased thickness as compared to the thickness of the steel laminate sheets 22 to increase the copper content at the ends of the motor and to increase the rigidity of the end sheet 21. A non-limiting exemplary thickness of copper end sheet 21 can be between 3.30 mm and 4.57 mm (0.130 inches and 0.180 inches). End sheet 21 can include a shoulder feature 23 configured to interact with a shaft inserted upon the rotor core 20. End sheet 21 can include interlocking features configured as tabs 26. In one exemplary embodiment, end sheet 21 can be stamped such that material that was originally part of the flat surface of end sheet 21 is severed around most of a perimeter, and the portion that is not severed is bent, such that a tab 26 is formed. According to one exemplary embodiment, tab 26 can include a wider section toward the end of the tab and a narrower portion near the bend in the tab, such that when end ring 30 is molded over the end sheet 21, material of the end ring 30 is enclosed around the wider section of the tab and the thinner neck section, preventing the end ring 30 from being pulled off of the tab. Other shapes or configurations of interlocking features can be formed or attached to end sheet 21, and the disclosure is not intended to be limited to the particular examples set forth herein. The interlocking features of end sheet 21 can be symmetrical around the axis of rotation for the rotor core 20 to maintain balance in the spinning core. Tabs 26 can by symmetrically spaced around the surface of the end sheet 21, for example, with all tabs being at a substantially same radius from the axis of rotation and spaced equally about the end sheet, making a circle of tabs on the face of the end sheet 21.

The conductor bars 40 are disclosed to include optional features at each of a first end and a second end of the conductor bars 40 although only the first end will be discussed in detail. It will be appreciated that the conductor bars 40 may include the features described on the first end only with different features utilized at the second end.

Each conductor bar 40 includes the first portion 42, a main portion 44, and the second portion 46, and each has a peripheral edge 45. The first portion 42 extends longitudinally beyond the first end 24 of the rotor core 20. The second portion 46 extends longitudinally beyond the second end 26 of the rotor core 20. The main portion 44 is contained within the grooves 28 formed in the rotor core 20. The peripheral edge 45 of each conductor bar 40 projects through the grooves 28 on the periphery 25 along the main portion 44.

In addition to interlocking features formed in or attached to end sheet 21, other features can be used to affix the end cap 30 to the rotor core 20. The first and second portions 42, 46 can include a recess 48 that starts at the first and second ends 24, 26 of the rotor core 20, respectively, that moves the peripheral edge 45 closer to the axis of rotation 15. The recess 48 ends in a tab 58 extending away from the axis of rotation 15.

Each of the annular-shaped shorting end rings 30 can be fabricated from copper-based materials and has a plurality of shorting end ring grooves 32 that correspond to the grooves 28 of the rotor core 20. Alternatively, the shorting end rings 30 may be fabricated from aluminum-based materials or other electrically conductive materials. The shorting end ring 30 is illustrated with end ring groove 32 are designed to accommodate one of the first and second portions 42, 46 of the conductor bars 40 by slip fit. Each shorting end ring 30 can in one embodiment include a stepped side portion 50 with a first periphery 52 having a larger diameter than a second periphery 54. The first periphery 52 is sized to correspond with the tab 58 and the second periphery 54 is sized to correspond with the recess 48. The second periphery 54 is sized accept a lock ring 56 and to place an outer diameter of the lock ring 56 approximately equal to the rotor core 20 when fully assembled between the first periphery 52 and the first end 24. Lock ring 56 can be fitted to the rotor core 20 and end ring 30 assembly, for example, by heating up and expanding the lock ring 56, and permitting the lock ring 56 to cool and contract to fit into recess 48, with the tightened ring acting to further affix the end ring 30 to the rotor core 20.

Figure 2:
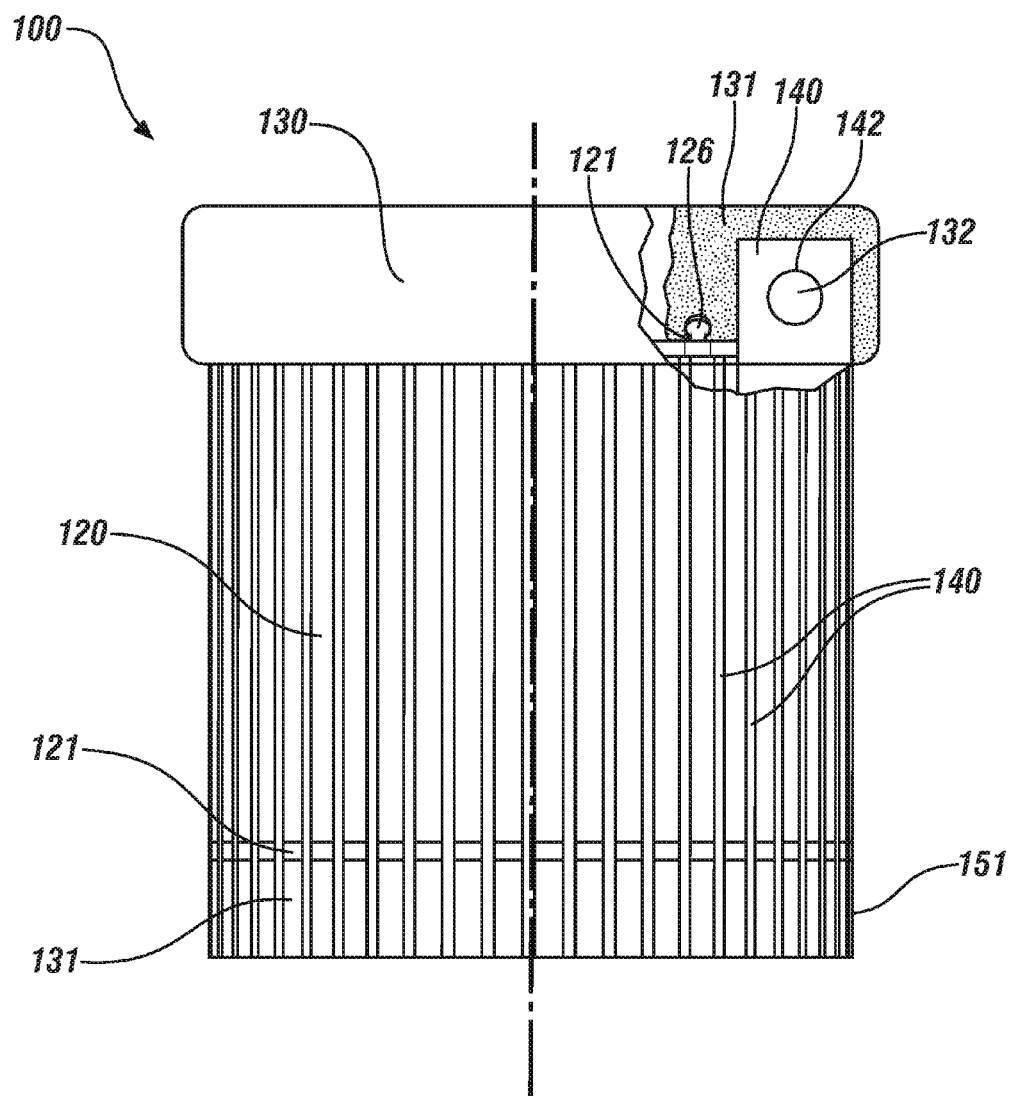
FIG. 2 illustrates a sectional view of a rotor core assembly for an induction motor, including optional holes in conductor bars of the motor, in accordance with the present disclosure.

FIG. 2 illustrates a sectional view of a rotor core assembly for an induction motor, including optional holes in conductor bars of the motor functioning as interlocking features between the conductor bars and an end ring. Configuration 100 is illustrated including rotor core 120 and end cap 130. Rotor core 120 includes a plurality of conductor bars 140, wherein at least one of the conductor bars 140 includes a hole 142 located to act as an interlocking feature with end ring 130, wherein material 132 of end ring 130 is molded within or is otherwise affixed to hole 142. A section is illustrated cut away from configuration 100 to show exemplary interaction between hole 132, tab 126, and end ring 130. End sheet 121 is additionally illustrated including at least one tab 126 connected to end sheet 121 and protruding into the area of end ring 130. As the end ring 130 is molded or otherwise formed around tab 126, material from end ring 130 is formed around and grips to tab 126. Embodiments wherein most or all of the conductor bars 130 include holes 132 and the end sheet 121 includes many tabs spaced around the surface of end sheet 121 are envisioned.

End ring 130 is illustrated as manufactured with extra material molded around the perimeter of and past the ends of the conductor bars 140. This extra material can be machined off during the manufacturing process. Second end 151 of the rotor core includes end sheet 121 and end ring 131 with the excess material machined away. A number of methods to manufacture a rotor core including a molded end ring are envisioned, and the disclosure is not intended to be limited to the particular examples provided herein.

Figure 3:
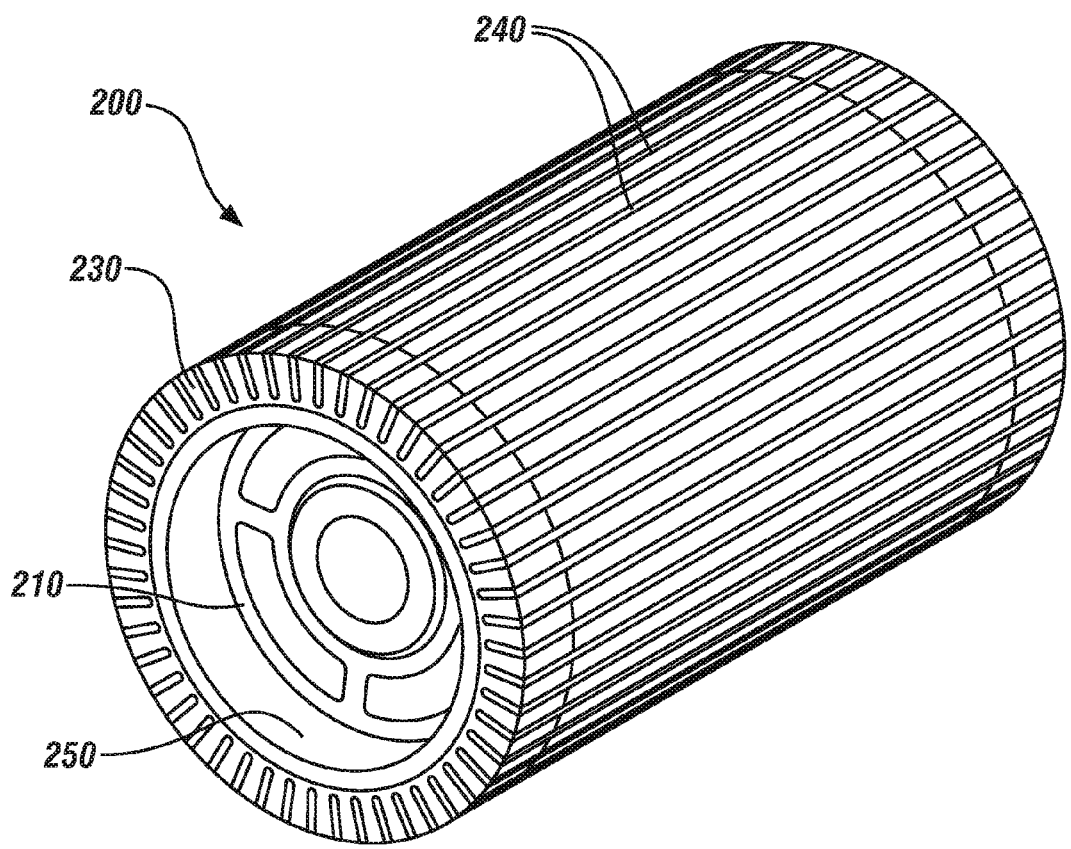
FIG. 3 illustrates an isometric view of another embodiment the rotor core assembly for an induction motor, including an optional retention end ring, in accordance with the present disclosure.

FIG. 3 is an isometric view of another embodiment the rotor core assembly for an induction motor, including an optional retention end ring. Conductive properties of the motor are improved by increased copper content in the ends of the motor. The end ring can be conveniently molded in aluminum. An aluminum molded end ring can be coupled with copper features at the ends of the rotor core to realize the benefits of the easily molded aluminum end ring and the increased copper mass. Configuration 200 includes a rotor core including a plurality of conductor bars 240, an end sheet 210 including a retention ring 250, and end ring 230. Retention ring 250 can be attached to the end sheet, can interlock with the conductor bars 240 or otherwise attach to configuration 200 to provide for attachment of end ring 230 to the configuration. Further, retention ring 250 can provide additional rigidity to the end ring 230.

Retention ring 250 can be made of many different materials including aluminum or copper. Retention end ring 250 can be smooth. Retention ring 250 can include details that tend to increase retention of a molded aluminum end ring to the end sheet. The retention end ring 250 can include a rough surface, annular grooves, bumps, stamped tabs, or any other details that would grip into a molded end ring. The retention end ring 250 can be bolted, riveted, or otherwise attached to end sheet 210. Retention ring 250 could be combined with the tabs on end sheet 210 so that it could be a simple tube cut to length and inserted into the mold before the aluminum was introduced.

Figure 4:
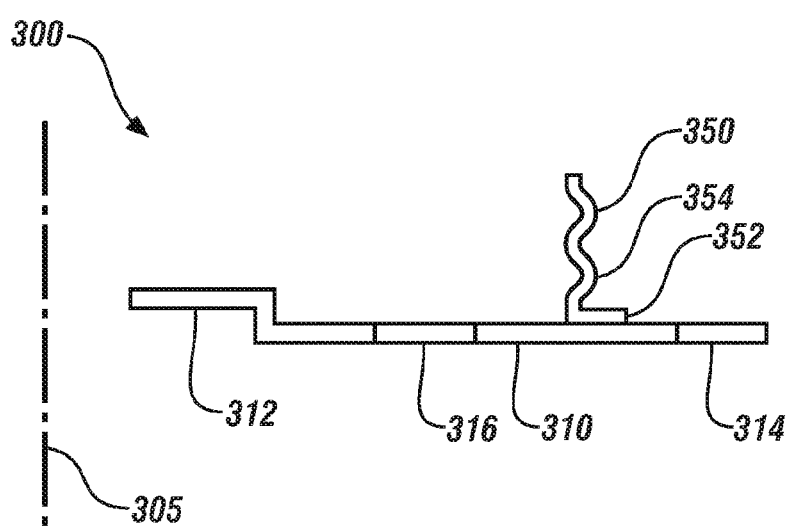
FIG. 4 illustrates an exemplary end sheet in cross section with a retention end ring affixed to the end sheet and with exemplary details to enable the retention end ring to act as a retention feature between the end sheet and a molded end ring, in accordance with the present disclosure.

An end sheet with a retention feature can include an end sheet with a retention end ring affixed or unitary with the end sheet. FIG. 4 illustrates an exemplary end sheet in cross section with a retention end ring affixed to the end sheet and with exemplary details to enable the retention end ring to act as a retention feature between the end sheet and a molded end ring. Configuration 300 includes end sheet 310 with a retention end ring 350 affixed thereto. A half of end sheet 310 is illustrated, starting from an axis of rotation 305 to an outer diameter including conductor bar holding feature 314. Shoulder feature 312 for connection to a motor shaft is illustrated. Weight reduction cut-out 316 is additionally illustrated. End sheet 310 and retention end ring 350 can be constructed of copper to increase the copper content at the end of the motor. Retention end ring 350 includes groove retention features 354 configured to grip to an end ring molded to the surface of end sheet 310. Retention end ring 350 is affixed to end sheet 310 at surface 352 through rivets, welds, or by any other method known in the art to connect one copper member to another copper member. End sheet 310 can additionally include tabs or other retention features as disclosed herein.

All retention features disclosed herein can be used on one end of an rotor core or on both ends. In one embodiment, alternative retention features can be used on different ends of the rotor core. For example, and end sheet with tabs could be used on one end of the rotor core, and a retention end ring could be used on a second end of the rotor core.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An induction motor, comprising:
    a rotor core comprising:
        a cylindrically shaped steel laminate stack including a plurality of longitudinal grooves distributed around the periphery of the steel laminate stack; and
        a plurality of conductor bars, each located in one of the plurality of longitudinal grooves and each comprising a first end projecting from a first end of the steel laminate stack;
    a shorting end ring comprising a plurality of grooves aligned with and mated to the first ends of the conductor bars; and
    the rotor core further comprising an end sheet located to the end of the steel laminate stack, the end sheet comprising a retention feature configured to retain the shorting end ring to the end sheet.

2. The induction motor of claim 1, wherein the retention feature includes a tab extending from the end sheet.

3. The induction motor of claim 2, wherein the tab comprises a thin neck section at a base of the tab and a thicker section away from the base of the tab.

4. The induction motor of claim 1, wherein the retention feature comprises a plurality of tabs spaced symmetrically about a surface of the end sheet.

5. The induction motor of claim 4, wherein at least one of the conductor bars includes a hole in the first end of the conduction bar;
    wherein the shorting end ring is molded upon the rotor core; and
    wherein the hole in the first end of the conduction bar retains the end ring to the rotor core.

6. The induction motor of claim 4, wherein each of the plurality of the conductor bars includes a respective hole in the respective first end;
    wherein the shorting end ring is molded upon the rotor core; and
    wherein the holes in the first ends of the plurality of conduction bars retain the end ring to the rotor core.

7. The induction motor of claim 4, further comprising a lock ring retaining the end ring to the rotor core.

8. The induction motor of claim 4, wherein the end sheet further comprises a retention end ring.

9. The induction motor of claim 8, wherein the retention end ring includes details to retain the shorting end ring to the end sheet.

10. The induction motor of claim 9, wherein the details comprise one of annular grooves, bumps, or tabs.

11. The induction motor of claim 8, wherein the end sheet and the retention end ring are constructed of copper; and
    wherein the shorting end ring is a molded aluminum shorting end ring.

12. The induction motor of claim 1, wherein the retention feature comprises a retention end ring.

13. The induction motor of claim 1, wherein the retention end ring is affixed to the end sheet.

14. The induction motor of claim 1, wherein the rotor core includes a retention feature on both sides of the rotor core.

15. The induction motor of claim 1, wherein the end sheet comprises a copper end sheet.

16. The induction motor of claim 15, wherein the steel laminate stack comprises a plurality of steel sheets of a first thickness; and wherein the copper end sheet is a second thickness greater than the first thickness.

17. An induction motor, comprising:

a rotor core comprising:

a cylindrically shaped steel laminate stack including a plurality of longitudinal grooves distributed around the periphery of the steel laminate stack; and a plurality of conductor bars, each located in one of the plurality of longitudinal grooves and each comprising a first end projecting from a first end of the steel laminate stack and each conductor bar comprising a hole in the projecting first end;

a shorting end ring comprising a plurality of grooves aligned with and mated to the first ends of the conductor bars; and the rotor core further comprising an end sheet located to the end of the steel laminate stack, the end sheet comprising a plurality of tabs stamped from a surface of the end sheet and projecting toward the shorting end ring configured to retain the shorting end ring to the end sheet;

wherein the holes in the first ends of the conductor bars are configured to retain the shorting end ring to the rotor core.

\* \* \* \* \*